United States Patent
Stawski

(10) Patent No.: US 10,213,954 B2
(45) Date of Patent: Feb. 26, 2019

(54) NATURAL PATH FORMING FOR COMPOSITE MATERIAL

(71) Applicant: THE BOEING COMPANY, Chicago, IL (US)

(72) Inventor: Stanley Warren Stawski, Camano Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 372 days.

(21) Appl. No.: 15/047,834

(22) Filed: Feb. 19, 2016

(65) Prior Publication Data

US 2017/0239876 A1 Aug. 24, 2017

(51) Int. Cl.
| | | |
|---|---|---|
| *B29C 53/02* | (2006.01) | |
| *B29K 277/00* | (2006.01) | |
| *B29K 307/04* | (2006.01) | |
| *B29K 309/08* | (2006.01) | |
| *B29C 53/06* | (2006.01) | |
| *B29C 53/04* | (2006.01) | |
| *B29C 53/36* | (2006.01) | |
| *B29C 53/82* | (2006.01) | |

(52) U.S. Cl.
CPC .............. *B29C 53/02* (2013.01); *B29C 53/04* (2013.01); *B29C 53/06* (2013.01); *B29C 53/36* (2013.01); *B29C 53/82* (2013.01); *B29K 2277/00* (2013.01); *B29K 2307/04* (2013.01); *B29K 2309/08* (2013.01)

(58) Field of Classification Search
CPC ......... B29C 53/02; B29C 53/04; B29C 53/06; B29C 53/36; B29C 53/82

USPC ........ 425/500, 383, 403; 264/258, 299, 313, 264/316
See application file for complete search history.

(56) References Cited

U.S. PATENT DOCUMENTS

| 7,794,019 B2 | 9/2010 | Hoberman | |
|---|---|---|---|
| 8,795,567 B2 * | 8/2014 | Bland | ................... B29C 70/205 264/258 |
| 2011/0250381 A1 * | 10/2011 | Nyman | ................. B29C 70/342 428/114 |

OTHER PUBLICATIONS

First Annotated Fig. 3, annotated by Examiner and saved as electronic PDF file, Nyman et al., US 2011/0250381 A1, Figure 3. (Year: 2011).*

(Continued)

*Primary Examiner* — Joseph S Del Sole
*Assistant Examiner* — Lawrence D. Hohenbrink, Jr.
(74) *Attorney, Agent, or Firm* — Marshall, Gerstein & Borun LLP

(57) ABSTRACT

A method includes the step placing composite laminate material onto a three dimensional forming tool with an external surface and at least four junctures associated with the external surface. Each juncture is positioned between two adjacent planar surfaces in which each of the two adjacent surfaces extend in a different plane, the junctures converge and each juncture defines a line of direction. The three dimensional forming tool arranged in a two dimensional pattern, has the lines of direction and the two adjacent planar surfaces positioned on opposing sides of each of the at least four junctures are all positioned in a common plane. The line of direction of each of the at least four junctures in the two dimensional pattern converge to a common point. At least one line of direction is not in alignment beyond the common point with another line of direction. Tool apparatus is also provided.

17 Claims, 6 Drawing Sheets

(56) References Cited

OTHER PUBLICATIONS

Second Annotated Fig. 3, annotated by Examiner and saved as electronic PDF file, Nyman et al., US 2011/0250381 A1, Figure 3. (Year: 2011).*

* cited by examiner

NATURAL PATH FORMING FOR COMPOSITE MATERIAL

FIELD

The present invention relates to a method for forming laminate composite material with overlaying the laminate composite material onto a three dimensional forming tool, and more particularly, to hot draping laminate composite material onto a three dimensional forming tool.

BACKGROUND

In overlaying hot drape composite laminate material onto a three dimensional form in fabricating three dimensional parts, it is a difficult and problematic to reduce fiber wrinkling within plies of composite laminate material. Each three dimensional part has a unique configuration such that ply wrinkling is often unknown until trial parts are made. As fibers in a ply extend over a contour in the three dimensional forming tool the fibers tend to wrinkle. Wrinkling of the fibers is not desired since wrinkling diminishes the strength performance of the finished composite part.

Fibers tend to wrinkle more so with steeper ramp ratios employed in fabricating a composite part. Complications can be presented to a designer and manufacturer where a contour to the part to be assembled is needed for transitioning the shape of a particular part wherein the distance or run in which to accomplish the ramping or transitioning is limited. A steeper ramping or contour tends to promote wrinkling of the fibers within the plies of that part of the assembly. As a result, a less steep and shallower ramp ratio may be needed to reduce the undesired fiber wrinkling in fabrication, thereby affecting the overall design of the assembly being built. Design adjustments needed based on using shallower contours present complications for the designer of the assembly and result in additional costs.

In other instances, fabricators may select steeper contours and use more plies in constructing a particular composite laminated part in an attempt to counter the effect of fibers that will wrinkle in the part fabrication process. Designers may also use additional fibers or fiber configurations within the plies of the laminate composite material such as a fabric configuration in attempts to also counter the undesired strength performance of fiber wrinkling. These fabricating strategies lead to more expense in fabricating the part and cause the part to become heavier in weight.

There is a need for a method for reducing and eliminating the occurrence of wrinkling of fibers within the composite laminate material used in forming hot drape three dimensional components with a three dimensional forming tool wherein the three dimensional forming tool includes ramping or contoured sides. The method would need to permit the designer to use greater or steeper ramp ratios for a contour for component parts and provide the designer greater flexibility in designing of the composite part and its associated assembly, such as, for example, in fabricating an aircraft. The method would also need to prevent a need to add plies in an attempt to compensate for a drop in strength of the part with the occurrence of wrinkled fibers in the fabrication of the part. The addition of plies also adds unwanted weight to the fabricated part. Similarly, the method would need to reduce the occurrence of incorporating additional fibers or employing a fabric configuration to similarly attempt to compensate for a drop in strength of the part with the occurrence of wrinkled fibers in the fabrication of the part.

SUMMARY

An example of a method for forming a composite component includes the step of placing composite laminate material onto a three dimensional forming tool. The three dimensional forming tool includes an external surface and at least four junctures associated with the external surface wherein the composite laminate material overlies the at least four junctures. Each juncture is positioned between two adjacent planar surfaces in which each of the two adjacent planar surfaces extend in a different plane. Each of the at least four junctures comprises a line of direction in which each line of direction extends in a different direction. The at least four junctures converge such that with the three dimensional forming tool arranged in a two dimensional pattern, the line of direction of each of the at least four junctures and the two adjacent planar surfaces positioned on opposing sides of each of the at least four junctures are all positioned in a common plane, wherein the line of direction of each of the at least four junctures in the two dimensional pattern converge to a common point with at least one line of direction not in alignment beyond the common point with another line of direction.

An example of a three dimensional forming tool for forming a composite component, includes an external surface and at least four junctures associated with the external surface. Each juncture is positioned between two adjacent planar surfaces in which each of the two adjacent planar surfaces extend in a different plane. Each of the at least four junctures includes a line of direction in which each line of direction extends in a different direction. The at least four junctures converge such that with the three dimensional forming tool arranged in a two dimensional pattern, the line of direction of each of the at least four junctures and the two adjacent planar surfaces positioned on opposing sides of each of the at least four junctures are all positioned in a common plane. The line of direction of each of the at least four junctures in the two dimensional pattern converge to a common point with at least one line of direction not in alignment beyond the common point with another line of direction.

DESCRIPTION

Figure 1:
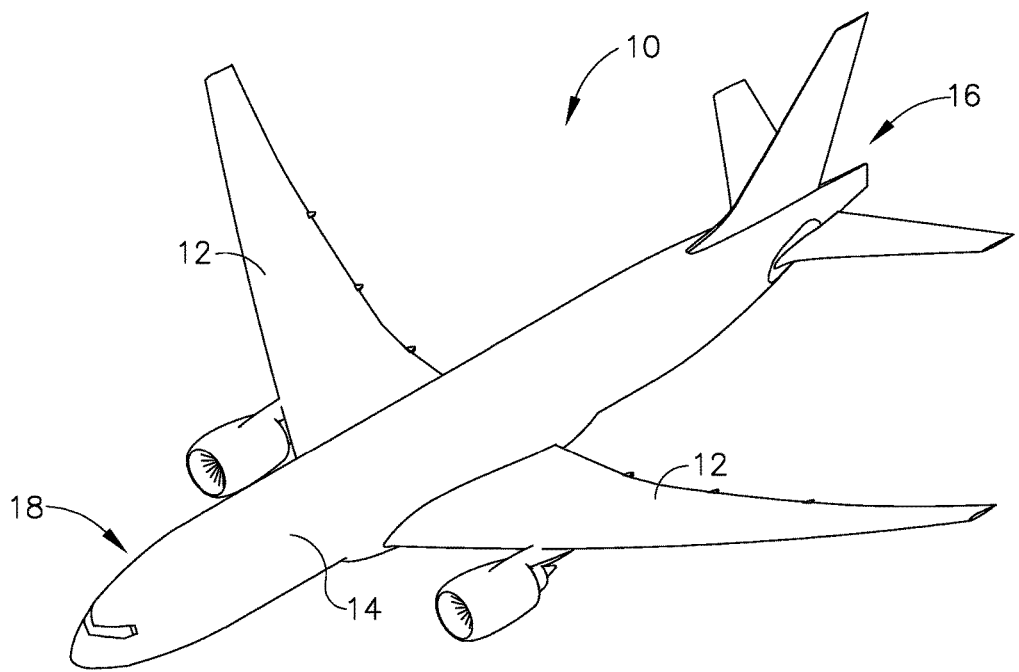
FIG. 1 is a perspective view of an aircraft.

In referring to FIG. 1, aircraft 10 includes sub-assemblies, such as wings 12, fuselage 14, tail section 16 and nose section 18 which are fabricated with composite materials. Each of these sub-assemblies require reinforcements positioned on an internal portion of aircraft 10 to provide additional strength for the sub-assembly for handling loads experienced by the sub-assembly during operation of aircraft 10. In fabrication of the reinforcement members with composite laminate material, it is desirable to avoid wrinkling of the fibers of the composite laminate material so as not to reduce the strength performance of the reinforcement component. With occurrence of wrinkling in fabrication, additional plies of composite may be employed in the fabrication of the reinforcement component, additional fibers may be added as well as employing fabric configurations of the fibers to compensate for strength loss due to fiber wrinkling during fabrication. All of these measures will add cost and weight to the sub-assembly and overall to aircraft 10. In an attempt to counter wrinkling during fabrication of the reinforcement component, longer runs, for a ramping of the reinforcement component may be needed, which present additional design complications and ultimately additional cost.

Figure 2:
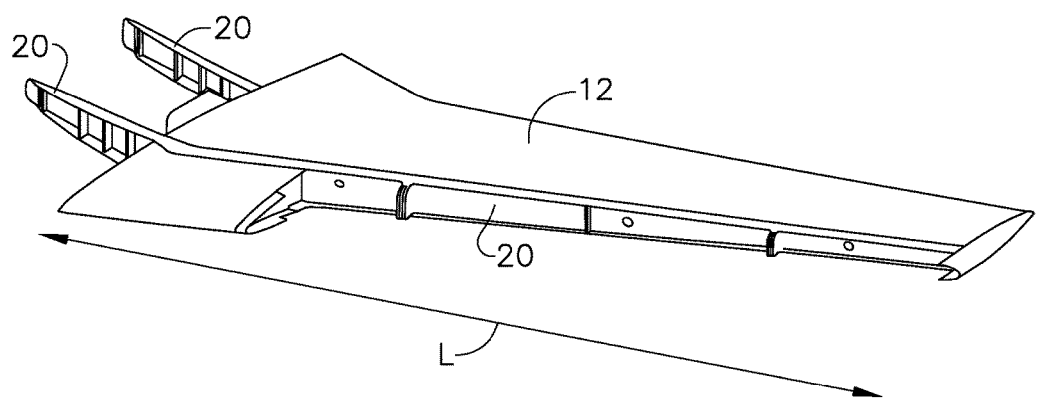
FIG. 2 is a schematic cut away perspective view of a wing of the aircraft of FIG. 1 showing a portion of a spar.

In referring to FIG. 2, wing 12 sub-assembly is shown with reinforcement spars 20 positioned on an internal portion of the wing 12 sub-assembly. Spars 20 extend outwardly from fuselage 14 and along a length L of wing 12. Spars 20 provide reinforcement and strength to wing 12 to support flight loads and weight of the wings while on the ground and to support aerodynamic loads with aircraft 10 in flight operation. With composite laminate material employed for construction of spars 20, fibers of the composite laminate material positioned to extend in a direction along length L of wing 12, need to avoid wrinkling during fabrication of spar 20, in order to optimize the strength of wing 12. A method for forming a composite component, such as for example spar 20, will be discussed in detail below.

Figure 3:
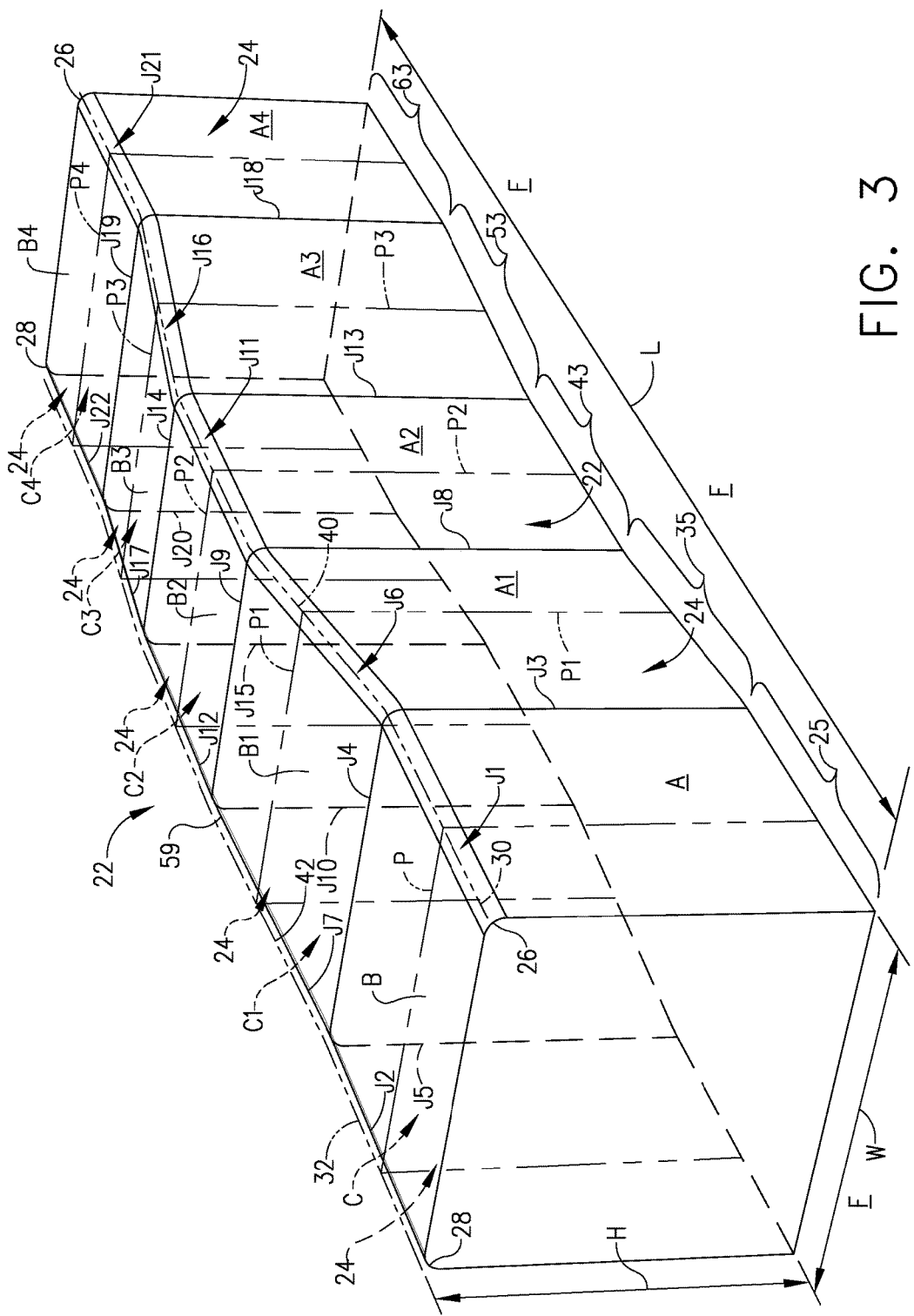
FIG. 3 is a perspective view of a three dimensional forming tool for a portion of the spar shown in FIG. 2.
Figure 4:
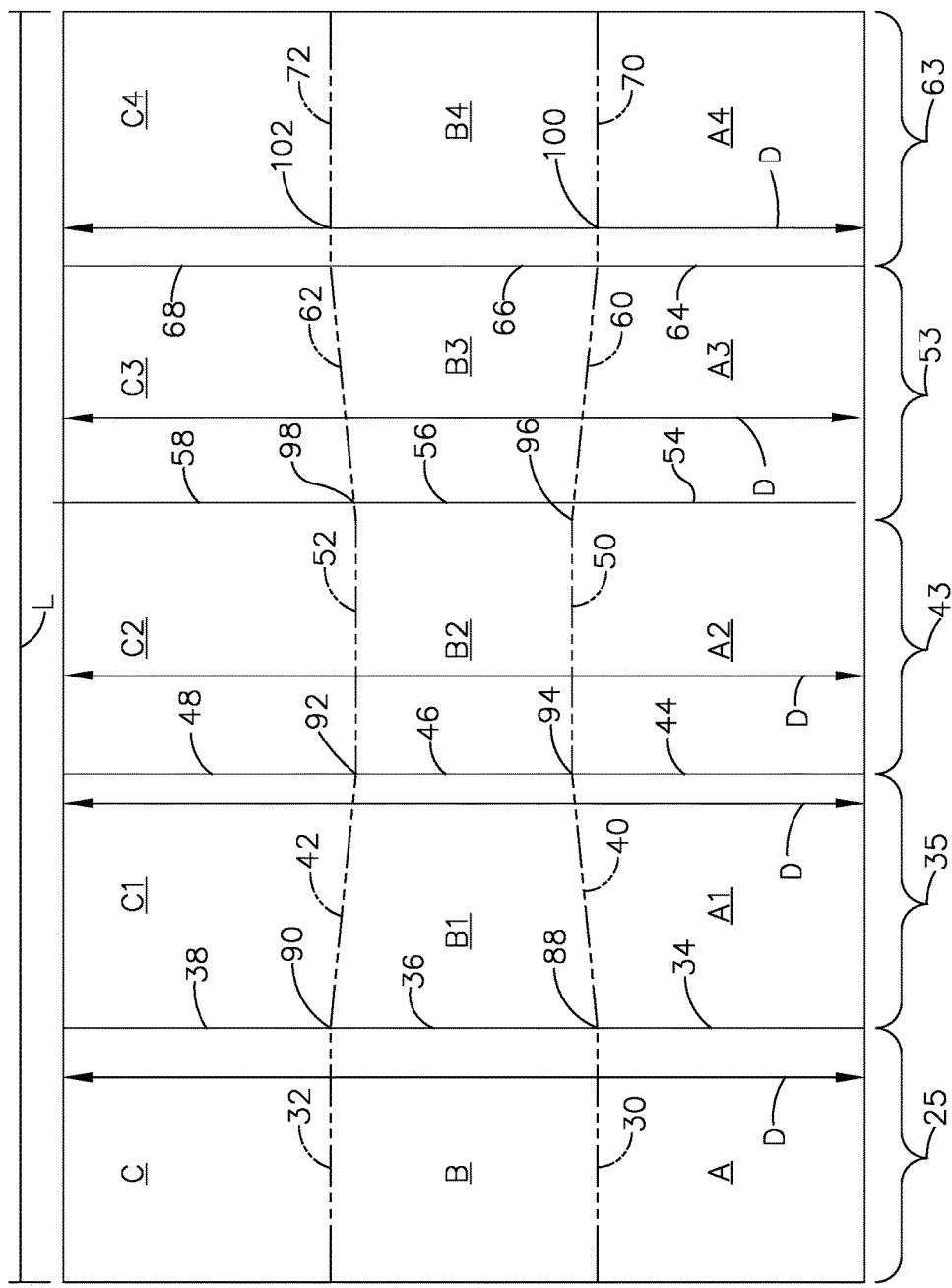
FIG. 4 is a plan schematic view of a two dimensional pattern arrangement of the three dimensional forming tool shown in FIG. 3 showing adjacent planar surfaces of an external surface of the three dimensional forming tool and a line of direction of each juncture positioned between adjacent planar surfaces all positioned in a common plane.

In referring to FIG. 3, a three dimensional forming tool 22 with external surface 24 is shown for fabricating a section of spar 20. In this example, forming tool 22 is a closed ended form which could be either solid or framed in construction. Three dimensional forming tool 22 is shown in a two dimensional pattern as shown in FIG. 4, as will be described in further detail herein. The geometric features of forming tool 22 will be discussed with respect to FIG. 3. The geometric relationships of forming tool 22 will assist in avoiding wrinkling of fibers during the fabrication of spar 20. An example of avoidance of wrinkling of fibers within composite laminate material 23, seen in FIG. 5 for example, which overlie forming tool 22 and extend in a length L direction of forming tool 22 in fabricating spar 20 will be discussed below. The configuration of forming tool 22, an example of which is described herein below, can be employed for forming composite laminate material constructed of pre-preg material or constructed with employment of separately introduced dry fiber and resin. For purposes of discussing the utilization of forming tool 22 configuration, the example discussed herein will include the use of hot drape composite laminate pre-preg material.

It would be a less difficult task to lay-up composite laminate material 23 with reduced wrinkling of fibers within composite laminate material wherein the fibers extend along a length direction of spar 20, where a forming tool for spar 20 includes two parallel spaced apart planar surfaces for forming planar flanges which extend along a length of spar 20. Additionally, this would be facilitated where a planar web member extends between and is positioned transverse to the two parallel flanges such that the planar web member extends in a plane at a constant elevation or in a flat position along the length of spar 20. This configuration can be seen in a first portion 25 of forming tool 22 in FIG. 3 with external surface 24 of forming tool 22 having three successive planar surfaces A, B, and C for forming spar 20.

Figure 5:
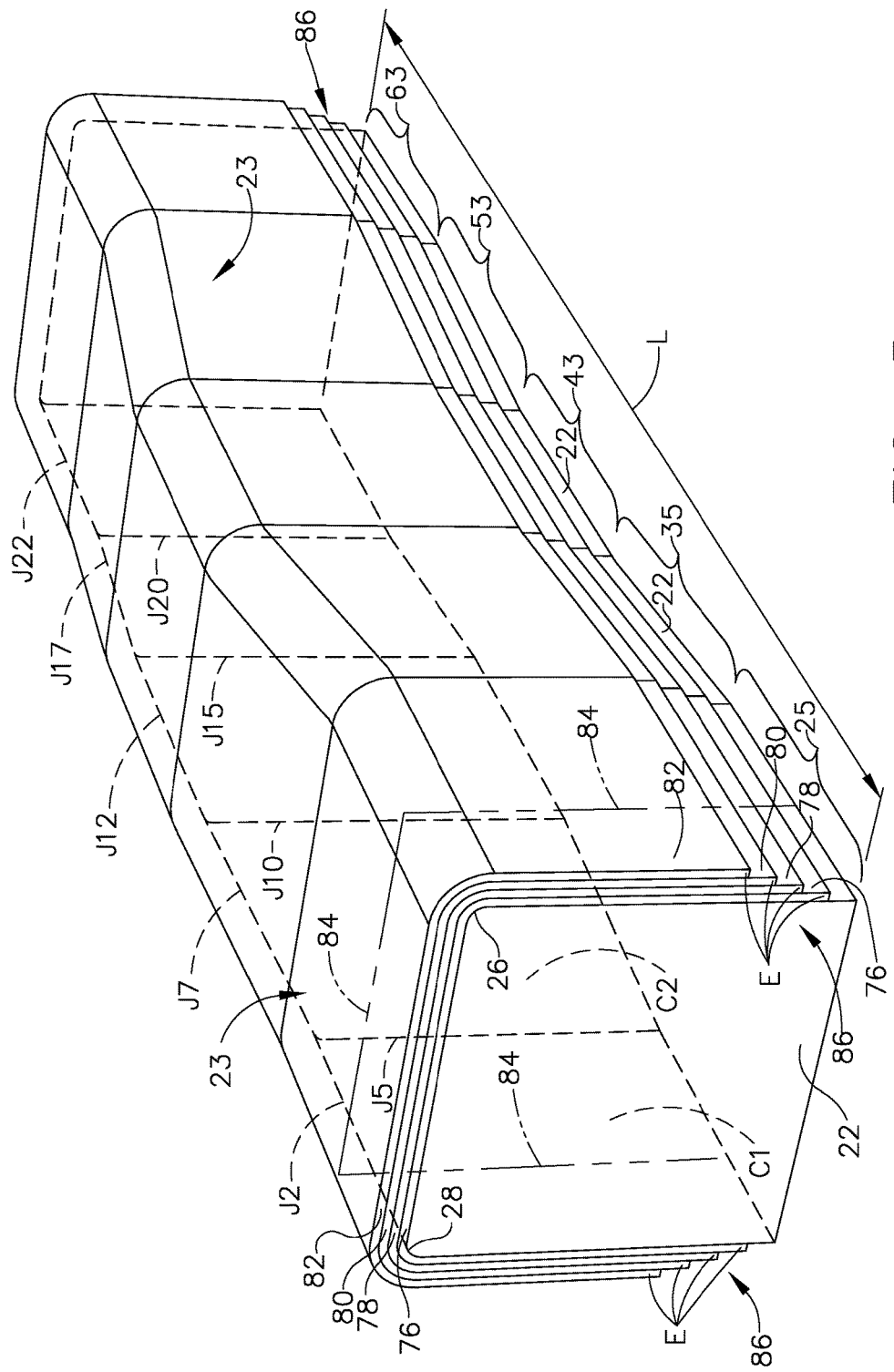
FIG. 5 is a perspective view of the three dimensional forming tool of FIG. 3 with a hot drape of composite laminate material overlying the three dimensional forming tool.

Planar surfaces A, B and C extend in a direction about a perimeter P of forming tool 22 in a direction transverse to the direction of length L of forming tool 22. Two of the planar surfaces A and C of the three successive planar surfaces A, B and C are spaced apart from one another and are generally parallel to one another. Planar surfaces A and C extend in a height direction H in an upward direction relative to flat support surface F and extend in a length direction L of forming tool 22. Intermediate planar surface B is positioned between two planar surfaces A and C and, in this example, is transverse to two planar surfaces A and C. Planar surface B extends in a plane in a direction along length L of forming tool 22 in a constant elevation or flat plane relative to flat support surface F upon which forming tool 22 rests and extends in a width direction W between planar surfaces A and C. The placing of hot drape composite laminate material 23, as seen in FIG. 5, onto the three successive planar surfaces A, B and C, the two planar surfaces A and C form two flanges and intermediate planar surface B forms a web positioned between and connecting the two flanges formed from planar surfaces A and C.

These three successive planar surfaces A, B and C of forming tool 22 have juncture J1 in external surface 24 positioned between two adjacent planar surfaces A and B in which each of the planar surfaces A and B extend in a different plane. In this example, planar surface A and B are positioned generally perpendicular to one another. Similarly juncture J2 is positioned in external surface 24 and is positioned between planar surfaces B and C in which each of planar surfaces B and C extend in a different plane. In this example, planar surfaces B and C are positioned generally perpendicular to one another. As can be seen in the three dimensional representation of forming tool 22 in FIG. 3, juncture J1 forms a radius edge 26 in external surface 24 providing a transition between planar surfaces A and B and juncture J2 similarly forms other radius edge 28 in external surface 24 providing a transition between planar surfaces B and C. Radius edge 26 and other radius edge 28 would be within a range, for this example, of including 0.0125 inches to including 0.50 inches radius dimensions. Juncture J1 extends in a line of direction 30 and juncture J2 extends in a line of direction of 32, as also seen in FIG. 4 in the two dimensional pattern of forming tool 22.

As mentioned above in this example, planar surfaces A and C extend in a direction along length L of forming tool 22 for spar 20 in parallel relationship to one another and intermediate planar surface B extends between planar surfaces A and C in generally a perpendicular relationship to planar surfaces A and C. Planar surface B extends in a direction along length L of forming tool 22 in a plane at substantially a constant elevation or flat relative to flat support surface F. Perimeter P is the distance about planar surfaces A, B and C, as seen in FIG. 3, and which length is shown as distance D in portion 25 the two dimensional pattern of forming tool 22 in FIG. 4. Perimeter P remains a length of distance D, regardless of the position from which perimeter P is measured from along the direction of length L of forming tool 22 within portion 25. The configuration of planar surfaces A, B and C of first portion 25 of forming tool 22 would contribute to reduced wrinkling to fibers positioned within composite material 23, as seen in FIG. 5, that extend along a direction of length L of forming tool 22.

However, in proceeding in a direction along length L of forming tool 22, a second portion 35 of forming tool 22 is positioned adjacent to first portion 25. Second portion 35 includes three more successive planar surfaces A1, B1, and C1 which extend in a direction of perimeter P1 about forming tool 22. Perimeter P1 extends in a direction transverse to the direction of length L of forming tool 22, as seen in FIG. 3. A joggle or change in configuration in spar 20 to be fabricated from forming tool 22 is commenced with planar surfaces A1, B1 and C1 of external surface 24 of forming tool 22. As shown in FIG. 3, planar surface A1 is positioned adjacent to planar surface A with juncture J3 positioned there between in external surface 24 and planar surfaces A and A1 each extend in a different plane. Planar surface B1 is positioned adjacent to planar surface B with juncture J4 positioned there between in external surface 24 and planar surfaces B and B1 each extend in a different plane. Planar surface C1 is positioned adjacent to planar surface C with juncture J5 positioned there between in external surface 24 and planar surfaces C and C1 each extend in a different plane. Junctures J3, J4 and J5 as seen in FIG. 3, each have a line of direction 34, 36 and 38 respectively, as seen in the two dimensional pattern shown in FIG. 4.

In second portion 35, planar surface A1 extends in an inward direction relative to forming tool 22 and planar surface A, in a direction toward planar surface C1 and planar surface C1 extends in an inward direction, relative to forming tool 22 and planar surface C, in a direction toward planar surface A1, such that planar surfaces A1 and C1 converge toward one another as planar surfaces A1 and C1 extend in a direction along length L away from planar surfaces A and C, respectively, of forming tool 22. Planar surface B1 rises in elevation above flat support surface F and relative to planar surface B, as planar surface B1 extends away from planar surface B and in a direction along length L of forming tool 22. At the same time, planar surfaces A1 and C1 increase in height above flat support surface F. With this configuration, as planar surfaces A1 and C1 converge planar surface B1 rises and resulting in the heights of planar surfaces A1 and C1 extending higher above flat support surface F and at the same time a width dimension which extends in the direction of width dimension W of forming tool 22, reduces in length for planar surface B1. These changing configurations results in a constant length of distance D for perimeter P1, as seen in FIG. 4. Distance D remains constant regardless of what position perimeter P1 is measured from along the direction of length L of forming tool 22 positioned in portion 35 of forming tool 22. This length of distance D for perimeter P1 is the same length as distance D for perimeter P of successive planar surfaces A, B and C, as seen in FIG. 4. Thus, the perimeter about planar surfaces A, B and C and about planar surfaces A1, B1 and C1 of forming tool 22 remains the same length of distance D along first and second portions 25 and 35 of forming tool 22.

Three successive planar surfaces A1, B1 and C1 have juncture J6 in external surface 24 positioned between two adjacent planar surfaces A1 and B1 in which each of the adjacent planar surfaces A1 and B1 extend in a different plane. Similarly juncture J7 is positioned in external surface 24 and is positioned between adjacent planar surfaces B1 and C1 in which each of planar surfaces B1 and C1 also extend in a different plane. As can be seen in the three dimensional representation of forming tool 22 in FIG. 3, juncture J6 forms, in this example, the same radius edge 26 in external surface 24 and juncture J7 similarly forms the same other radius edge 28 in external surface 24 as discussed above for first section 25. Juncture J6 extends in a line of direction 40 and juncture J7 extends in a line of direction of 42, as seen in the two dimensional pattern in FIG. 4. The placing of hot drape composite laminate material 23, as seen in FIG. 5, onto the three successive planar surfaces A1, B1 and C1, the two planar surfaces A1 and C1 form two flanges and intermediate planar surface B1 forms a web positioned between and connecting the two flanges formed from planar surfaces A1 and C1 resulting in a portion of spar 20 being fabricated within portion 35.

In this example, shown in FIG. 3, third portion 43 of forming tool 22 includes the next three successive planar surfaces A2, B2 and C2. These planar surfaces A2, B2 and C2 extend in a direction about a perimeter P2 of forming tool 22 in a direction transverse to the direction of length L of forming tool 22, such as was the direction for perimeters P and P1. In this example, two of planar surfaces A2 and C2 are spaced apart from one another and are generally parallel to one another. Intermediate planar surface B2 is positioned between two planar surfaces A2 and C2 positioned, in this example, generally perpendicular to two planar surfaces A2 and C2. The placing of composite laminate material 23, as seen in FIG. 5, onto three successive planar surfaces A2, B2 and C2, the two planar surfaces A2 and C2 form two flanges and intermediate planar surface B2 forms a web positioned between and connecting two flanges A2 and C2.

Proceeding in direction length L along forming tool 22, from second portion 35 of forming tool 22, which includes three successive planar surfaces A1, B1 and C1, to third portion 43 of forming tool 22, which includes three successive planar surfaces A2, B2, and C2, external surface 24 of forming tool 22 includes juncture J8 positioned between adjacent planar surfaces A1 and A2 in which each of these planar surfaces A1 and A2 extend in a different plane. Planar surface A2 no longer extends in an inward direction in relationship to forming tool 22 as did planar surface A1. External surface 24 of forming tool 22 includes juncture J9 positioned between adjacent planar surfaces B1 and B2 in which each of these planar surfaces B1 and B2 extend in a different plane. Planar surface B2 extends along in a direction of length L of forming tool 22 at a constant elevation above flat support surface F from a highest elevation above flat support surface F attained by planar surface B1. Additionally, external surface 24 of forming tool 22 includes juncture J10 positioned between adjacent planar surfaces C1 and C2 in which each of these planar surfaces C1 and C2 extend in a different plane. Planar surface C2 no longer extends in an inward direction in relationship to forming tool 22 as did planar surface C1. In this third portion 43 planar surfaces A2 and C2 no longer converge toward one another. Both planar surfaces A2 and C2 angle relative to planar surfaces A1 and C1 respectively and in third portion 43 planar surfaces A2 and C2 extend in substantially parallel relationship to one another. In second portion 35, planar surface B1 was extending in a plane rising in elevation above flat support surface F as planar surface B1 extended in a direction away from planar surface B. Adjacent planar surface B2 extends at a constant elevation above flat support surface F or flat as it extends away from planar surface B1. Junctures J8, J9 and J10 each respectively have a line of direction 44, 46 and 48, as seen in FIG. 4.

Three successive planar surfaces A2, B2 and C2 of forming tool 22 have juncture J11 in external surface 24 positioned between two adjacent planar surfaces A2 and B2 in which each of planar surfaces A2 and B2 extend in a different plane. In this example, planar surface A2 and B2 are positioned generally perpendicular to one another. Similarly juncture J12 is positioned in external surface 24 and is positioned between planar surfaces B2 and C2 in which each of planar surfaces B2 and C2 extend in a different plane. In this example, planar surface B2 and C2 are positioned generally perpendicular to one another. As can be seen in the three dimensional representation of forming tool 22 in FIG. 3, juncture J11, in this example, forms a radius edge 26 in external surface 24 and juncture J12 similarly forms another radius edge 28 in external surface 24, such as described for sections 25 and 35. Juncture J11 extends in a line of direction 50 and juncture J12 extends in a line of direction of 52, as seen in FIG. 4.

As mentioned above, planar surfaces A2 and C2 extend in a direction along length L of forming tool 22 for forming spar 20 in substantially parallel relationship to one another and intermediate planar surface B2 extends between planar surfaces A2 and C2 in a transverse relationship to planar surfaces A2 and C2. Planar surface B2 extends in a direction along length L of forming tool 22 in a substantially flat orientation or at a constant elevation above flat support surface F. In this example, with planar surface B1 having extended in a rising plane relative to planar surface B, planar surface B2 is positioned at a higher elevation relative to planar surface B of first portion 25 of forming tool 22, and planar surfaces A2 and C2 extend upwardly a greater distance from flat support surface F than planar surfaces A and C in order to reach the higher elevation of planar surface B2. In conjunction with planar surfaces A2 and C2 extending a greater height distance than planar surfaces A and C, in contrast, a distance in a width direction W of planar surface B2 is less than that of a width distance of planar surface B. These changes between successive planar surfaces A, B and C in contrast to planar surfaces A2, B2 and C2 maintains perimeter P2 having the same length distance D measured at any position along length L of forming tool 22 within portion 43, as seen in FIG. 4, as that of length distance D of portions 25 and 35, as seen in FIG. 4, as that of perimeters P and P1 respectively, as seen in FIG. 3. Thus, perimeters P, P1 and P2 maintain the same length of distance D as measured anywhere along the direction of length L of forming tool 22 within the first, second and third portions 25, 35 and 43 of forming tool 22, as seen in FIG. 4, regardless of the above described orientations of the planar surfaces within the first, second and third portions 25, 35 and 43.

Proceeding in a direction along length L of forming tool 22, a fourth portion 53 of forming tool 22 includes three more successive planar surfaces A3, B3, and C3 of external surface 24 of forming tool 22 which extend in a direction about perimeter P3 of forming tool 22, as seen in FIG. 3. Perimeter P3 extends about forming tool 22 in a direction transverse to the direction of length L of forming tool 22. The joggle or change in configuration of spar 20 to be formed by forming tool 22 which was commenced with planar surfaces A1, B1 and C1 of second portion 35 will be completed in this example in fourth portion 53 with planar surfaces A3, B3 and C3.

As shown in FIG. 3, planar surface A3 is positioned adjacent to planar surface A2 with juncture J13 positioned there between in external surface 24 and planar surfaces A2 and A3 each extend in a different plane. Planar surface A3 extends in a different direction from planar surface A2 and extends in an outward direction relative to forming tool 22 and planar surface A2 and in a direction away from planar surface C3. Planar surface B3 is positioned adjacent to planar surface B2 with juncture J14 positioned there between in external surface 24 and planar surfaces B2 and B3 each extend in a different plane. Planar surface B2 extends in at constant elevation or flat relative to flat support surface F and planar surface B3 extends in a downward incline direction relative to flat support surface F as planar surface B3 extends along in direction L along forming tool 22. Planar surface C3 is positioned adjacent to planar surface C2 with juncture J15 positioned there between in external surface 24 and planar surfaces C2 and C3 each extend in a different planar direction. Planar surface C3 extends in an outward direction, relative to forming tool 22 and planar surface C2, and in a direction away from planar surface A3, such that planar surfaces A3 and C3 diverge in directions away from one another as planar surfaces A3 and C3 extend in a direction along length L away from planar surfaces A2 and C2, respectively, of forming tool 22. Junctures J13, J14 and J15 as seen in FIG. 3, each have a line of direction 54, 56 and 58 respectively, as seen in FIG. 4 in the two dimensional pattern.

As mentioned above, planar surface A3 extends in an outward direction away from planar surface C3 and planar surface C3 extends in an outward direction away from planar surface A3 such that planar surfaces A3 and C3 diverge in directions away from one another as planar surfaces A3 and C3 extend in a direction along length L away from planar surfaces A2 and C2, respectively, of forming tool 22. Planar surface B3 descends in elevation relative to flat support surface F and to planar surface B2 as planar surface B3 extends away from planar surface B2 and in a direction along length L of forming tool 22. With this configuration, as planar surfaces A3 and C3 diverge, planar surface B3 descends and the heights of planar surfaces A3 and C3 with respect to flat support surface F become shorter and a width dimension planar surface B3 taken in a direction of width dimension W increases in length. As a result, a constant length of distance D, as seen in FIG. 4, for perimeter P3 is maintained as measured at any position along the direction of length L of forming tool 22 within portion 53. This length of distance D is the same length as distance D, as seen in FIG. 4, for perimeters P, P1 and P2, as seen in FIG. 3, of previously described first, second and third portions 25, 35 and 43 respectively of forming tool 22.

The three successive planar surfaces A3, B3 and C3 have juncture J16 in external surface 24 positioned between two adjacent planar surfaces A3 and B3 in which each of the planar surfaces A3 and B3 extend in a different plane. Similarly juncture J17 is positioned in external surface 24 and is positioned between planar surfaces B3 and C3 in which each of planar surfaces B3 and C3 extend in a different plane. As can be seen in the three dimensional representation of forming tool 22 in FIG. 3, juncture J16 forms, in this example, the same radius edge 26 in external surface 24 and juncture J17 similarly forms the same other radius edge 28 in external surface 24, as described above for first, second and third sections 25, 35 and 43. Juncture J16 extends in a line of direction 60 and juncture J17 extends in a line of direction of 62, as seen in FIG. 4. The placing of composite laminate material 23, as seen in FIG. 5, onto the three successive planar surfaces A3, B3 and C3, the two planar surfaces A3 and C3 form two flanges and intermediate planar surface B3 forms a web positioned between and connecting the two flanges formed from planar surfaces A3 and C3.

In proceeding in a direction along length L of forming tool 22, fifth portion 63 of forming tool 22 includes three more successive planar surfaces A4, B4, and C4 which extend in a direction about forming tool 22 of perimeter P4, as seen in FIG. 3. Perimeter P4 extends about forming tool 22 in a direction transverse to the direction L of length of forming tool 22. In this example forming tool 22, with planar surfaces A4, B4 and C4 takes on a configuration similar of that of first section 25 which included planar surfaces A, B and C.

As shown in FIG. 3, planar surface A4 is positioned adjacent to planar surface A3 with juncture J18 positioned there between in external surface 24 and planar surfaces A3 and A4 each extend in a different plane. Planar surface A3, as described above, extends along the direction of length L of forming tool 22 in a direction diverging relative to forming tool 22 and away from planar surface C3, and in contrast extends in a different direction from planar surface A4. Planar surface A4 extends in a substantially parallel direction with planar surface C4. Planar surface B4 is positioned adjacent to planar surface B3 with juncture J19 positioned there between in external surface 24 and planar surfaces B3 and B4 each extend in a different plane. Planar surface B3, as described above, extends in a descending incline relative to flat support surface F, in contrast, planar surface B4 extends in a substantially constant elevation of flat relative to flat support surface F. Planar surface C4 is positioned adjacent to planar surface C3 with juncture J20 positioned there between in external surface 24 and planar surfaces C3 and C4 each extend in a different plane. Planar surface C3 extends in a direction along length L of forming tool 22 in a direction diverging relative to forming tool 22 and in a direction away from planar surface A3. Planar surface C4 extends in a different direction from planar surface C3 and extends in a substantially parallel direction with planar surface A4. Planar surfaces A4 and C4, in this example, are spaced apart a distance along planar surfaces A4 and C4 to which planar surfaces A3 and C3 are spaced apart at junctures 18 and 20. Junctures J18, J19 and J20 as seen in FIG. 3, each have a line of direction 64, 66 and 68 respectively, as seen in FIG. 4 in the two dimensional pattern.

As mentioned above, in this example, planar surface A4 extends spaced apart from and substantially parallel to planar surface C4. Planar surface B4 extends from planar surface B3 at a constant elevation or flat relative to flat support surface F. Length distance D for perimeter P4 is the same as measured at any position along length L within portion 63 of forming tool 22. Length distance D is maintained at the same length as that of perimeters P, P1, P2 and P3 of first portion 25, second portion 35, third portion 43, and fourth portion 53, respectively, of forming tool 22. As a result, the perimeter of forming tool 22 extending about three successive planar surfaces in a direction transverse to length L of forming tool 22, as seen in FIG. 3, is configured to have the same length of distance D, as seen in FIG. 4, of its perimeter, in this example, regardless of the position the perimeter is measured from along the length L of the forming tool 22.

Three successive planar surfaces A4, B4 and C4 have juncture J21 in external surface 24 positioned between two adjacent planar surfaces A4 and B4 in which each of the planar surfaces A4 and B4 extend in a different plane. In this example, planar surfaces A4 and B4 are positioned generally perpendicular to one another. Similarly juncture J22 positioned in external surface 24 and positioned between planar surfaces B4 and C4 in which each of planar surfaces B4 and C4 extend in a different plane. In this example, planar surfaces B4 and C4 are positioned generally perpendicular to one another. As can be seen in the three dimensional representation of forming tool 22 in FIG. 3, juncture J21 forms, in this example, the same radius edge 26 in external surface 24 and juncture J22 similarly forms the same other radius edge 28 in external surface 24 as discussed above for first section 25. Juncture J21 extends in a line of direction 70 and juncture J22 extends in a line of direction of 72, as seen in FIG. 4. The placing of hot drape composite laminate material 23, as seen in FIG. 5, onto the three successive planar surfaces A4, B4 and C4, the two planar surfaces A4 and C4 form two flanges and intermediate planar surface B4 forms a web positioned between and connecting the two flanges formed from planar surfaces A4 and C4.

The forming tool 22 described above is an example of a forming tool configuration to be employed to form spar 20 such that fibers in composite laminate material avoids wrinkling in a length direction of spar 20 in the fabrication process. In particular, the method to be discussed herein for fabricating spar 20 includes utilizing hot drape pre-preg composite laminate material with unidirectional fibers employed in the direction of length L of forming tool 22. The method for forming the composite component, in this example spar 20, employs heating pre-preg composite laminate material 23 and placing the hot drape composite material 23 over forming tool 22, as seen in FIG. 5. Other composite laminate materials other than pre-preg material can also be used as mentioned earlier above such as separately introduced dry fiber and resin. A wide variety of laminate materials can be employed constructed of select resin and fiber materials. Composite laminate material 23, in this example, includes a plurality of plies containing fibers. The fibers can be constructed from one of a number of fiber materials such as carbon, fiberglass and aramid. The fibers can be configured in one of a number of configurations including a fabric that is woven or knitted, a tape and unidirectional fibers and the like. Plies of the composite material 23 can be selectively oriented such that fibers within successive plies may extend in different desired angular directions relative to one another to provide a particular desired strength in the reinforcement component. Resins can be selected from one of thermoset and thermoplastic resins. A number of plies will be employed to obtain the desired strength.

In the method for forming a composite component, the example of forming tool 22 described herein has an external surface 24 which provides a reduction of wrinkling of fibers, which extend along the length L direction of the external surface. This configuration of external surface 24 is beneficial where the component being constructed, such as spar 20, has a joggle or change of contour. This configuration of external surface 24 is likewise beneficial in an instance where the component being constructed may include a tapering of a portion of the component being constructed or also in a tapering of a portion of the component being constructed in conjunction with a joggle or contouring of the component as well. External surface 24 of forming tool 22, as described herein, is beneficial in avoiding wrinkling of fibers for fabrication of composite laminate components having external shapes or contours which change as one extends along its surface such as saddle-like shaped configurations and the like. With the reduction of occurrence of wrinkling, there is less need for additional plies, less need for additional fibers and less need of fibers configured in a fabric configuration in order to attempt to compensate for strength loss from fiber wrinkling in the length direction of spar 20. With the reduction in wrinkling, unidirectional fibers, in this example, are employed within the plies of the hot drape pre-preg composite laminate material 23. The unidirectional fibers extend along the length of spar 20 the direction that provides the needed strength in spar 20 in the construction of the sub-assembly of wing 12.

The composite laminate material 23 selected in this example, such as pre-preg, is then heated. The composite laminate material 23 is heated to include a room temperature of approximately seventy degrees Fahrenheit (70° F.) up to include the temperature of two hundred degrees Fahrenheit (200° F.). Composite laminate material 23 can be heated for a time period up to and including one hour as needed by the resin to permit slipping between plies of the laminate. The heating of the resin within the composite laminate material 23 will permit the resin to reduce its shear resistance such that with the hot draping of composite laminate material 23 onto forming tool 22, the individual adjacent plies within the composite laminate 23 can move relative to one another in the direction of the perimeter 84 of forming tool 22, as seen in FIG. 5. The ability of adjacent plies to move relative to one another will also help avoid distortion of the fibers extending in this example in the direction of length L of forming tool 22 when placed onto forming tool 22. Other pre-preg materials which have a less viscous resin at around room temperature, for example, could be employed such that their resin will permit plies to slip relative to one another with being placed on forming tool 22. In use of such pre-preg materials additional heating above room temperature would not be needed. In the instance of using forming tool 22 in a resin transfer molding process, dry fiber can be placed on the forming tool 22 and resin introduced with heating applied during the forming process.

Figure 6:
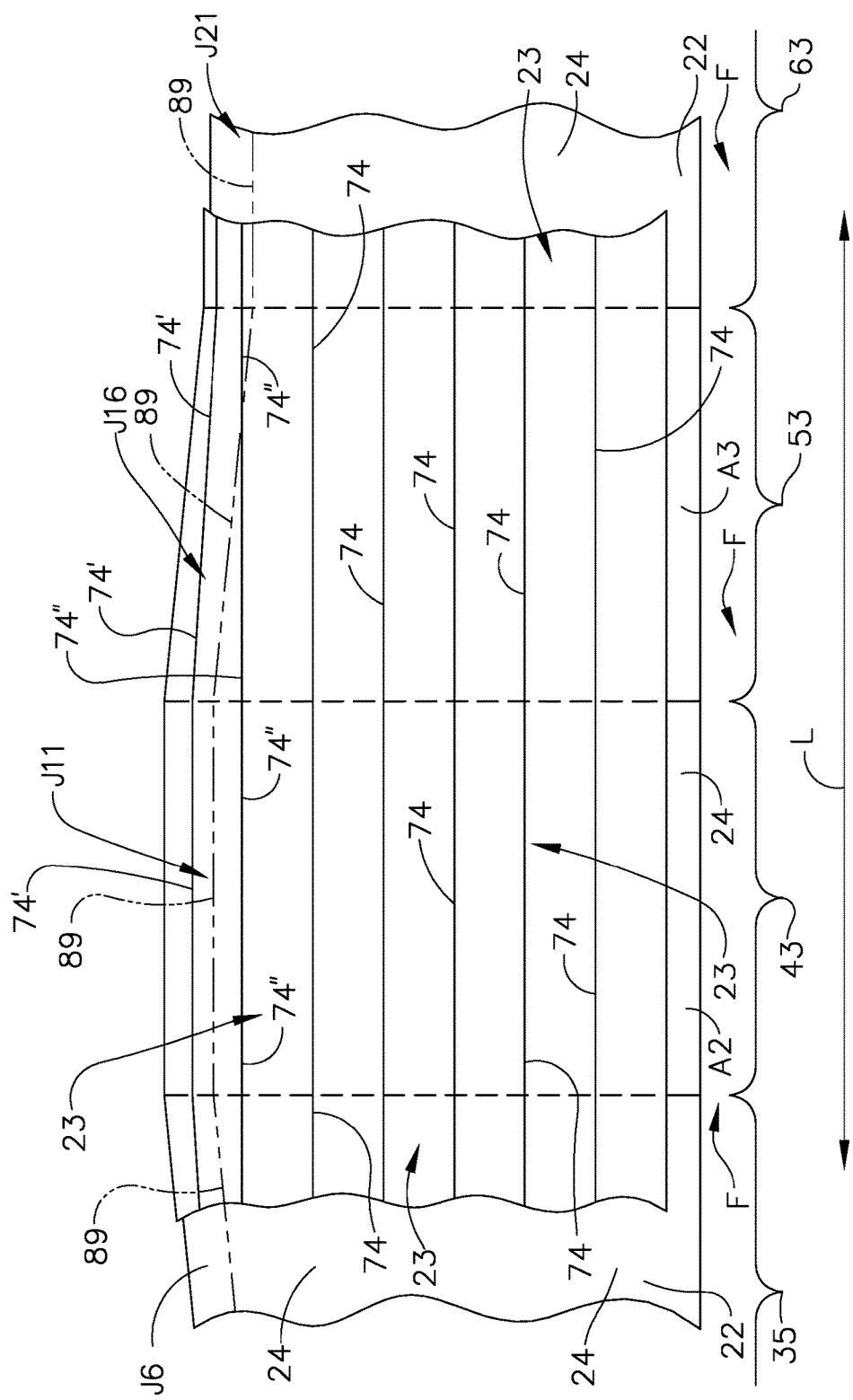
FIG. 6 is a partial side elevation view of FIG. 5 with a schematic representation of a ply of composite laminate material overlying a portion of an external surface of the forming tool with selected fibers of the ply of the composite laminate material shown extending in a length direction of the three dimensional forming tool.
Figure 7:
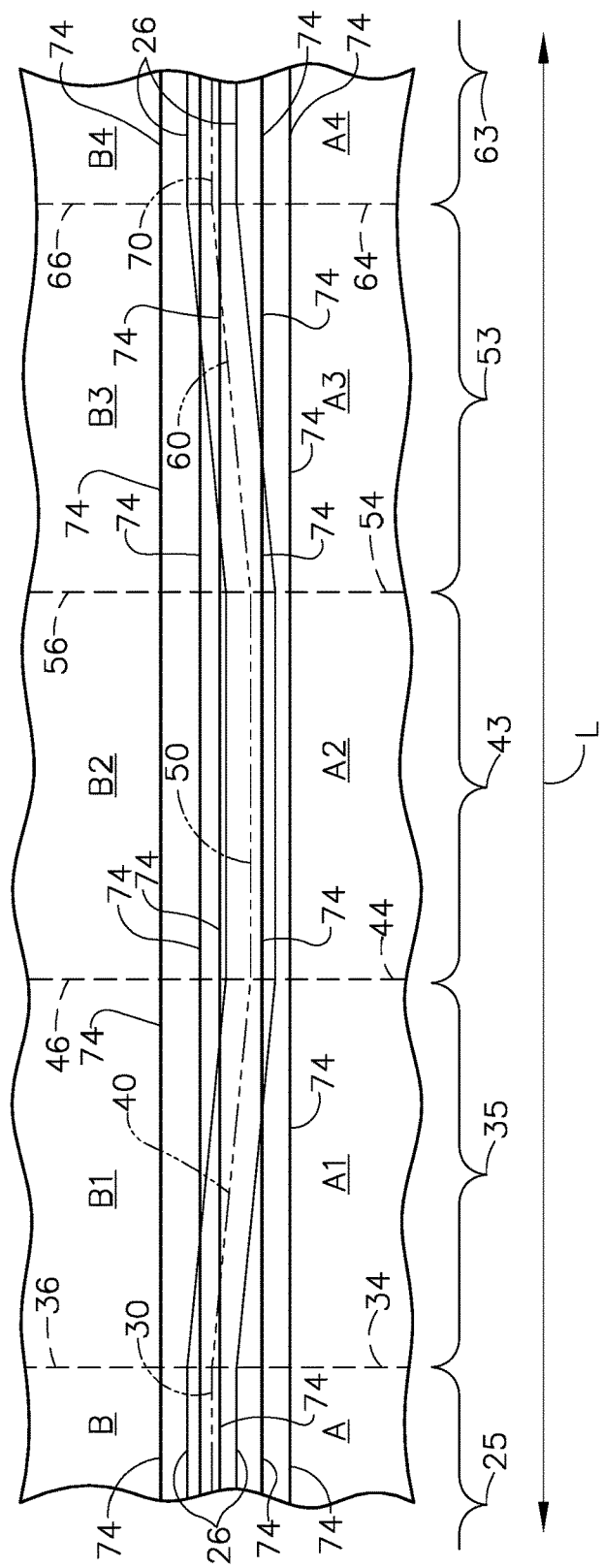
FIG. 7 is an partial enlarged plan schematic view of the two dimensional pattern arrangement of the three dimensional forming tool of FIG. 4 schematically showing the position of selected fibers of the composite laminate material, which overlies the three dimensional forming tool of FIG. 5, relative to the two dimensional pattern arrangement of the three dimensional forming tool.

In further referring to FIG. 5, in this example of the method for forming a composite component such as spar 20, once the heating of pre-preg composite laminate material 23 has been completed, material 23 is then placed onto three dimensional forming tool 22. In this example, a plurality of fibers 74 within composite laminate material 23, as seen in FIGS. 6 and 7, are positioned in a unidirectional configuration which extends along length L of forming tool 22.

In referring to FIG. 5, hot drape composite laminate material 23 schematically shows a plurality of plies 76, 78, 80 and 82. With composite laminate material 23 having been heated the resin becomes less viscous reducing the shear resistance of the resin. With placing hot drape composite laminate material 23 onto external surface 24 of forming tool 22, the resin between plies 76 and 78; 78 and 80; and 80 and 82, will permit these adjacent plies to slide or slip relative to one another in a direction about perimeter 84, as seen in FIG. 5.

The edges of the plies of the composite laminate material 23 are normally substantially in alignment during the heating process. With the heating process completed and the composite laminated material 23 placed onto forming tool 22, successive adjacent plies 76, 78, 80 and 82 slip relative to one another so as to accommodate the increased perimeter about the forming tool 22 created by each successive ply of the composite laminate material 23. As a result, edges E of plies, such as 76, 78, 80 and 82 take on the appearance of successive steps 86, as seen in FIG. 5. This configuration phenomenon is often referred to as how the pages of at an edge of a phonebook arrange themselves into successive steps with the phonebook draped over a support.

Placing the hot draped composite laminate material 23 onto external surface 24 of forming tool 22 will provide the slipping of successive plies of the composite laminate material 23. The configuration of external surface 24 of forming tool 22, as discussed herein, will provide the support to composite laminate material 23 and to fibers 74 within hot draped composite laminate material 23 so as to extend in a length L direction of forming tool 22, as seen in FIG. 6, and reduce and avoid unwanted wrinkling of fibers 74.

External surface 24, as previously described with respect to FIGS. 3 and 4, provide at least four junctures, such as J1, J3, J4 and J6, wherein the hot drape composite laminate material 23, as seen in FIG. 5, overlies these at least four junctures. External surface 24 has a plurality of groups of at least four junctures such as J1, J3, J4 and J6 described herein. Other such groups of at least four junctures in this example include J2, J4, J5 and J7; J6, J8, J9 and J11; J7, J9, J10 and J12; J11, J13, J14 and J16; J12, J14, J15 and J17; J16, J18, J19 and J21; and J17, J19, J20 and J22 provide a topography functionality of maintaining fibers 74 extending in the direction along length L of forming tool 22 without significant wrinkling in fabrication of spar 20.

For example, at least four junctures J1, J3, J4 and J6, as is the case for the other groupings of junctures mentioned above, are each positioned between two adjacent planar surfaces in which each of the two adjacent planar surfaces extend in a different plane. As described earlier above, planar surfaces A and B; B and B1; B1 and A1; and A1 and A are each a set of two adjacent planar surfaces in which each planar surface within two adjacent planar surface extend in different planes and directions wherein the junctures positioned in between each two adjacent planar surfaces include: juncture J1 is positioned between planar surfaces A and B; juncture J4 is positioned between planar surfaces B and B1; juncture J6 is positioned between planar surfaces B1 and A1; and juncture J3 is positioned between planar surfaces A1 and This is similarly the case for the above mentioned other identified groups of at least four junctures wherein adjacent planar surfaces have a juncture positioned between the adjacent planar surfaces with the adjacent planar surfaces extending in a different plane. In each of the above identified groups of at least four junctures, the junctures within each of the groups converge.

Each of the junctures, J1, J3, J4 and J6 has a line of direction in which they extend. Each line of direction extends in a different direction as can be seen in FIG. 3. They also can be seen to extend in different directions with being positioned in two dimensional pattern of forming tool 22 in FIG. 4. Juncture J1 extends in a line of direction 30, juncture J3 extends in line of direction 34, juncture J4 extends in a line of direction 36 and juncture J6 extends in a line direction 40.

Junctures J1, J3, J4 and J6 can be seen in FIG. 3 with respect to three dimensional forming tool 22. Each of these junctures has a line of 30, 34, 36 and 40, respectively, which can be seen in the two dimensional pattern of forming tool 22 in FIG. 4. These lines of direction 30, 34, 36 and 40 respectively represent the direction of the junctures in the two dimensional pattern of FIG. 4. Lines of direction 30, 34, 36 and 40 are shown in two dimensional pattern of FIG. 4 positioned into a single common plane. Two adjacent planar surfaces positioned on opposing sides of each of the at least four junctures, J1, J3, J4 and J6 are extending in different planes in FIG. 3, as identified above, and are also positioned into the single common plane of the two dimensional pattern of FIG. 4 of forming tool 22. Thus, for example, planar surfaces A, B, A1 and B1, each of which extend into a different plane as seen in FIG. 3, are all positioned into the same single common plane of two dimensional pattern of FIG. 4 along with the line of direction of each of the junctures associated with these planar surfaces.

The lines of directions, of each of the at least four juncture groups identified above, such as for example, 30, 34, 36 and 40 converge to common point 88, as seen in FIG. 4. Other common points such as 90, 92, 94, 96, 98, 100 and 102 which are identified by the convergence of other lines of direction from the above identified groups of at least four junctures are also shown in FIG. 4. In the two dimensional pattern shown in FIG. 4, common point 88, for example, has at least one line of direction, for example, line of direction 40 which is not in alignment beyond common point 88 with another line of direction. As can be seen in the other common point locations, at least one line of direction is not in alignment beyond the common point with another line of direction. This geometric configuration derived from external surface 24 of forming tool 22 provides assistance in avoiding wrinkling of fibers which extend in the direction of length L of forming tool 22.

In referring to FIG. 6, unidirectional fibers of composite laminate material 23, are used in this example, and are shown schematically as selected fibers 74 used in fabricating spar 20. Fibers 74 are shown to follow external surface 24 of planar surfaces of forming tool 22 used in forming spar 20. In fabricating spar 20, in this example, a sheet of composite laminate material 23 is selected with unidirectional fibers 74 wherein the sheet of composite laminate material generally has dimensions approximately of that of the two dimensional pattern, shown in FIG. 4, for forming tool 22. Fibers 74, which are positioned to extend in a unidirectional orientation extending generally along in the direction length L of forming tool 22, will substantially follow the length direction L as the fibers 74 follow over various planar surfaces of external surface 24.

In referring to FIG. 6, selected unidirectional fibers 74 of composite laminate material 23 extend along the direction of length L of forming tool 22 staying in a substantially unwrinkled condition as fibers 74 pass over external surface 24 which include, as shown for example, planar surfaces A2 and A3. Unidirectional fibers 74 follow planar surface A2 which extends in a relatively straight direction relative to the direction of length L of forming tool 22 and then pass over adjacent planar surface A3 wherein planar surface A3 extends outwardly relative to forming tool 22, planar surface A2 and outwardly relative to planar surface C3, not shown in FIG. 6. Fibers 74 remain generally in a constant distance between one another and extend in an unwrinkled condition along the direction of length L of forming tool 22.

Selected fibers 74 extend along planar surfaces A, A1, A2, A3 and A4, used to form a flange on spar 20, fibers 74 also extend along planar surfaces C, C1, C. C3 and C4 used to form an opposing flange of spar 20. Unidirectional fibers 74 extend along a joggle or change in contour in spar 20 flanges which are defined by portions 35, 43 and 53 of forming tool 22. Fibers 74 follow the direction of each planar surface while extending in the direction of length L of forming tool 22 in forming each of the flanges of spar 20. Fibers 74 extend along each of the opposing flanges without wrinkling and remaining generally a constant distance spaced apart from one another.

As seen in FIG. 6, lower edge 89 demarks the commencement of radius edge 26. Radius edge 26 transitions planar surfaces for forming a flange of spar 20 to another planar surface for forming a web of spar 20. In portion 43 lower edge 89 extends at a constant elevation along flat supporting surface F. Selected unidirectional fibers 74 positioned below edge 89 in portion 43 are seen extending substantially at a constant distance apart from one another and unwrinkled. This is similar for fibers 74 positioned below edge 89 that extend along planar surface A3.

In FIG. 6 selected fiber 74', for example, extends along portion 43 positioned above edge 89 and within and extending along radius edge 26. Planar surface B2 not shown in FIG. 6, runs substantially parallel to flat support surface F, radius edge 26 and lower edge 89 likewise extend along in direction of length L generally parallel to flat support surface F. Fiber 74' extends on radius edge 26 and generally parallel to lower edge 89 and stays generally at a constant distance to, for example, selected fiber 74" which extends along planar surface A2 within portion 43 positioned below lower edge 89 of radius edge 26. Selected fibers 74' and 74" each extends along portion 43 unwrinkled and extending generally a constant distance apart from one another.

As fiber 74' extends into portion 53, fiber 74' extends along upon radius edge 26. Lower edge 89 and radius edge 26 are in a descending incline relationship relative to flat supporting surface F as they extend away from portion 43 in the direction of length L of forming tool 22. At the same time planar surface A3 is extending outwardly from forming tool 22 and in a direction away from planar surface C3 not shown in FIG. 6. Selected fiber 74' in portion 53 of forming tool 22 follows the descending incline and because planar surface A3 is extending in a direction away from planar surface C3 not shown in FIG. 6, fiber 74' moves in a direction upwardly on radius edge 26 towards planar surface B3 and away from lower edge 89. However, fiber 74' remains substantially the same distance from adjacent fiber 74" positioned below upper fiber 74'. As fiber 74" extends across portion 53, selected fiber 74" similarly moves upwardly on planar surface A3 as planar surface A3 moves outwardly from forming tool 22 and away from planar surface C3 and height of planar surface A3 reduces relative to support flat surface F as planar surface of B3 extends in an incline toward supporting flat surface F. As the height of planar surface A3 continues to shorten relative to supporting flat surface F as planar surface A3 extends away from planar surface A2, fiber 74" extending in the length L direction of forming tool 22, as seen in FIG. 6, eventually crosses over lower edge 89 and onto radius edge 26.

In this example, as selective fibers 74' and 74" extend across portion 53 fiber 74' and 74" generally remain a constant distance apart. This constant distance of being spaced apart appears to be converging from this elevation view in FIG. 6, but that is not the case. Radius edge 26 is a curved surface while planar surface A3 is a relatively planar flat surface. With, planar surface A3 diverging away from planar surface C3, not shown in FIG. 6; planar surface B3, also not shown in FIG. 6, is inclined and descending in a direction toward flat support surface F as planar surface B3 extends away from planar surface B2; planar surface B3 is increasing in the width directions W of forming tool 22; and height of planar surface A3 is being reduced as A3 extends away from planar surface A2, fiber 74' is moving across portion 53, fiber 74' is moving upwardly on curved surface of radius surface 26 and fiber 74" is moving upwardly relative to planar surface A3 toward radius edge 26 and once fiber 74" has crossed over lower edge 89 fiber 74"continues to move upwardly on curved surface of radius edge 26.

This geometry permits selected fibers 74' and 74" to remain generally the same distance apart as fibers 74' and 74" extend away from portion 43 of forming tool 22. This maintenance of constant distance between fibers 74 can be more easily seen as shown in FIG. 7, wherein selected fibers 74 are shown schematically extending over a two dimensional plan view pattern of forming tool 22. In the schematic representation of FIG. 7, fibers 74 remain substantially a constant distance apart as fibers 74 pass along in direction of length L of forming tool 22 and as fibers 74 would follow over a varying and changing topography of external surface 24 of forming tool 22. This geometric relationship and topography of external surface 24, as seen in FIG. 3, provides and contributes to avoidance of wrinkling of selected fibers 74 as fibers 74 extend in direction L of forming tool 22 and over the topography of external surface 24.

In referring to FIG. 7, two dimensional pattern of a portion of external surface 24 of forming tool 22 is shown. Radial edge 26 is located on the two dimensional pattern indicating the location of radial edge 26 as it extends across external surface 24 in a direction along direction of length L of forming tool 22. Line of direction 30 of juncture J1 positioned between planar surfaces A and B; line of direction 40 of juncture J6 is positioned between planar surfaces A1 and B1; line of direction 50 of juncture J11 is positioned between planar surfaces A2 and B2; line of direction 60 of juncture J16 is positioned between planar surfaces A3 and B3; and line of direction 70 of juncture J21 is positioned between planar surfaces A4 and B4, as described earlier above. Line of directions 34, 44, 54 and 64 are those of junctures J3, J8, J13 and J18, respectively. Lines of directions, 36, 46, 56 and 66 are those of junctures J4, J9, J14 and J19, respectively.

In FIG. 7, selectively schematically shown unidirectional fibers 74 and their location relative to the two dimensional pattern of the planar surfaces and radial edges are shown. Selective fibers 74 are shown as they extend in a unidirectional direction along length L direction of forming tool 22. As unidirectional fibers 74 extend across locations of successive planar surfaces A, A1, A2, A3 and A4; across locations of successive planar surfaces B, B1, B2, B3 and B4; as well as across locations such as radial edge 26, selective fibers 74 of two dimensional pattern of forming tool 22 are shown to be positioned to extend substantially at a constant spaced apart distance between adjacent selected fibers 74 as they extend across the two dimensional pattern of forming tool 22. As fibers 74 within hot drape composite material 23 are positioned to overlie external surface 24 of forming tool 22, as seen in FIG. 5, fibers 74 are positioned within composite laminate material 23 such that fibers 74 extend in the direction shown schematically in FIG. 7. relative to the two dimensional pattern of forming tool 22. With fibers 74 extending across external surface 24 as shown schematically in FIG. 7, fibers 74 follow external surface 24 topography, as seen in FIG. 5, of forming tool 22, and fibers 74 experience reduced wrinkling of fibers 74 as fibers 74 extend in the direction of length L of forming tool 22 in the fabrication of spar 20.

While various embodiments have been described above, this disclosure is not intended to be limited thereto. Variations can be made to the disclosed embodiments that are still within the scope of the appended claims.

What is claimed:

1. A method for forming a composite component, comprising the step of:
   placing a composite laminate material onto a three dimensional forming tool which comprises:
   an external surface, comprising:
      a portion of the forming tool comprises three successive planar surfaces extending in a direction about a perimeter of the three dimensional forming tool in a direction transverse to a length of the three dimensional forming tool wherein two planar surfaces are spaced apart from one another with an intermediate planar surface positioned between the two planar surfaces;
      a second portion of the forming tool positioned adjacent to the portion of the forming tool comprises three successive planar surfaces extending in a direction about the perimeter of the three dimensional forming tool in a direction transverse to the length of the three dimensional forming tool wherein two planar surfaces are spaced apart from one another with an intermediate planar surface positioned between the two planar surfaces, wherein:
         the intermediate planar surface of the second portion is positioned adjacent to the intermediate planar surface of the portion of the forming tool;
         the intermediate planar surface of the second portion extends in a different plane relative to the intermediate planar surface of the portion; and
         the perimeter maintains a constant length along the length of the three dimensional forming tool; and
      at least four junctures associated with the external surface wherein the composite laminate material overlies the at least four junctures, wherein:
         each juncture is positioned between two adjacent planar surfaces in which each of the two adjacent planar surfaces extend in a different plane;
         each of the at least four junctures comprises a line of direction in which each line of direction extends in a different direction and
         the at least four junctures converge such that with the three dimensional forming tool arranged in a two dimensional pattern, the line of direction of each of the at least four junctures and the two adjacent planar surfaces positioned on opposing sides of each of the at least four junctures are all positioned in a common plane, wherein the line of direction of each of the at least four junctures in the two dimensional pattern converge to a common point with at least one line of direction not in alignment beyond the common point with another line of direction.

2. The method for forming a composite component of claim 1, wherein the composite laminate material comprises a plurality of fibers such that the step of placing the composite laminate material further includes positioning the plurality of fibers to extend along a length of the three dimensional forming tool.

3. The method for forming a composite component of claim 2, wherein the plurality of fibers are unidirectional in orientation.

4. The method for forming a composite component of claim 1, wherein the composite laminate material comprises a fiber constructed of one of carbon, aramid and fiberglass.

5. The method for forming a composite component of claim 1, wherein the composite laminate material comprises one of thermoset and thermoplastic resin.

6. The method for forming a composite component of claim 1, further includes the step of heating the composite laminate material.

7. The method for forming a composite component of claim 6, wherein the step of heating includes heating the composite laminate material to a temperature within a range of temperatures inclusive of a temperature of seventy degrees Fahrenheit (70° F.) up to and inclusive of two hundred degrees Fahrenheit (200° F.).

8. The method for forming a composite component of claim 6, wherein the step of heating includes heating the composite laminate material for a time period within up to one hour.

9. The method for forming a composite component of claim 6, wherein:
the intermediate planar surface of the portion of the forming tool is non-parallel to the two planar surfaces, such that when placing the composite laminate material which has been heated onto the three successive planar surfaces the two planar surfaces form two flanges and the intermediate planar surface forms a web positioned between and connecting the two flanges.

10. The method for forming a composite component of claim 9, the step of placing the laminate composite material onto the three dimensional forming tool further includes adjacent plies within the composite laminate material sliding relative to one another in a direction of the perimeter of the three dimensional forming tool.

11. A three dimensional forming tool for forming a composite component, comprising:
an external surface, comprising:
a portion of the forming tool comprises three successive planar surfaces extending in a direction about a perimeter of the three dimensional forming tool in a direction transverse to a length of the three dimensional forming tool wherein two planar surfaces are spaced apart from one another with an intermediate planar surface positioned between the two planar surfaces;
a second portion of the forming tool positioned adjacent to the portion of the forming tool comprises three successive planar surfaces extending in a direction about the perimeter of the three dimensional forming tool in a direction transverse to the length of the three dimensional forming tool wherein two planar surfaces are spaced apart from one another with an intermediate planar surface positioned between the two planar surfaces, wherein:
the intermediate planar surface of the second portion is positioned adjacent to the intermediate planar surface of the portion of the forming tool;
the intermediate planar surface of the second portion extends in a different plane relative to the intermediate planar surface of the portion; and
the perimeter maintains a constant length along the length of the three dimensional forming tool; and
at least four junctures associated with the external surface, wherein:
each juncture is positioned between two adjacent planar surfaces in which each of the two adjacent planar surfaces extend in a different plane;
each of the at least four junctures comprises a line of direction in which each line of direction extends in a different direction; and
the at least four junctures converge such that with the three dimensional forming tool arranged in a two dimensional pattern, the line of direction of each of the at least four junctures and the two adjacent planar surfaces positioned on opposing sides of each of the at least four junctures are all positioned in a common plane, wherein the line of direction of each of the at least four junctures in the two dimensional pattern converge to a common point with at least one line of direction not in alignment beyond the common point with another line of direction.

12. The three dimensional forming tool of claim 11, wherein the intermediate planar surface of the portion of the forming tool is non-parallel to the two planar surfaces wherein the two spaced apart planar surfaces are used to form two flanges and the intermediate planar surface is used to form a web positioned between the two flanges.

13. The three dimensional forming tool of claim 12, wherein a juncture forming a radius is positioned between the intermediate planar surface and each of the two spaced apart planar surfaces.

14. The three dimensional forming tool of claim 12, wherein with the two planar surfaces spaced apart from one another converging toward one another as the two planar surfaces extend along the length of the three dimensional forming tool, the intermediate planar surface narrows in a width direction of the three dimensional forming tool.

15. The three dimensional forming tool of claim 14, wherein the two planar surfaces spaced apart from one another increase in height relative to a flat support surface upon which the three dimensional forming tool is supported and the intermediate planar surface extends in a direction along the length of the three dimensional forming tool such that the intermediate planar surface increases in height above the flat support surface.

16. The three dimensional forming tool of claim 12, wherein with the two planar surfaces spaced apart from one another diverging away from one another as the two planar surfaces extend along the length of the three dimensional forming tool, the intermediate planar surface increases in a width direction of the three dimensional forming tool.

17. The three dimensional forming tool of claim 16, wherein the two planar surfaces spaced apart from one another decrease in height relative to a flat support surface upon which the three dimensional forming tool is supported and the intermediate planar surface extends in a direction long the length of the three dimensional forming tool such that the intermediate planar surface decreases in height above the flat support surface.

* * * * *